(12) United States Patent
Kada

(10) Patent No.: US 6,671,597 B2
(45) Date of Patent: Dec. 30, 2003

(54) ELECTRIC POWER STEERING CONTROLLER

(75) Inventor: Tomoyasu Kada, Kaizuka (JP)

(73) Assignee: Koyo Seiko Co., Ltd., Osaka (JP)

( * ) Notice: Subject to any disclaimer, the term of this patent is extended or adjusted under 35 U.S.C. 154(b) by 42 days.

(21) Appl. No.: 09/987,676

(22) Filed: Nov. 15, 2001

(65) Prior Publication Data

US 2002/0063016 A1 May 30, 2002

(30) Foreign Application Priority Data

Nov. 29, 2000  (JP) ........................................ 2000-363122

(51) Int. Cl.⁷ ............................................... B62D 5/04
(52) U.S. Cl. ......................... 701/41; 180/443; 180/446
(58) Field of Search ............................. 701/41, 42, 43; 180/443, 446

(56) References Cited

U.S. PATENT DOCUMENTS

| | | | |
|---|---|---|---|
| 4,989,682 A | | 2/1991 | Takahashi et al. |
| 5,473,539 A | * | 12/1995 | Shimizu et al. ............... 701/41 |
| 5,704,446 A | * | 1/1998 | Chandy et al. ............. 180/446 |
| 5,719,766 A | * | 2/1998 | Bolourchi et al. ............ 701/42 |
| 5,732,373 A | | 3/1998 | Endo et al. |
| 5,992,557 A | * | 11/1999 | Nakamura et al. .......... 180/446 |
| 6,013,994 A | * | 1/2000 | Endo et al. .................. 318/432 |
| 6,070,692 A | * | 6/2000 | Nishino et al. .............. 180/443 |
| 6,148,948 A | | 11/2000 | Shimizu et al. |
| 6,240,350 B1 | * | 5/2001 | Endo ............................ 701/41 |
| 6,360,151 B1 | * | 3/2002 | Suzuki et al. ................. 701/41 |
| 6,389,342 B1 | * | 5/2002 | Kanda .......................... 701/41 |
| 6,390,229 B1 | * | 5/2002 | Kaji ............................ 180/443 |
| 6,431,307 B2 | * | 8/2002 | Yoshida ....................... 180/446 |

* cited by examiner

Primary Examiner—Gary Chin
(74) Attorney, Agent, or Firm—Rabin & Berdo, P.C.

(57) ABSTRACT

A controller for an electric power steering system which generates a steering assist force by an electric motor driven on the basis of a steering torque applied to an operation member. The controller calculates an assist target electric current value by adding a first inertia compensation value, generated in accordance with a first steering torque differential value corresponding to a time-based differential value of the steering torque, to a basic assist electric current value determined in accordance with the steering torque, and preferably by further adding thereto a second inertia compensation value. This second inertia compensation value may be generated in accordance with a second steering torque differential value determined as a time-based differential value of a steering torque component obtained by removing a high frequency component from the steering torque.

4 Claims, 3 Drawing Sheets

ELECTRIC POWER STEERING CONTROLLER

BACKGROUND OF THE INVENTION

1. Field of the Invention

The present invention relates to a controller for an electric power steering system which assists a steering operation by utilizing a driving force generated by an electric motor.

2. Description of Related Art

Electric power steering systems are conventionally utilized which employ an electric motor as a source of a steering assist force to be applied to a steering mechanism. A controller for such an electric power steering system controls the electric motor on the basis of a vehicle speed and a steering torque applied to a steering wheel. More specifically, detection signals from a torque sensor for detecting the steering torque and a vehicle speed sensor for detecting the vehicle speed are inputted to the controller. The controller determines an electric current command value in accordance with the detection signals inputted from the torque sensor and the vehicle speed sensor, and feedback-controls the electric motor on the basis of the electric current command value.

The electric power steering system of this type suffers from a response delay (a delay in generation of the steering assist force in response to a change in steering torque) due to the inertia of the electric motor when the steering wheel is dynamically turned in opposite directions in a slalom steering operation or when the steering wheel is quickly turned to prevent the motor vehicle from diverting from a lane during traveling on a highway. With the response delay, a driver experiences a heavier steering feeling and an entrapped feeling when operating the steering wheel.

SUMMARY OF THE INVENTION

It is an object of the present invention to provide an electric power steering controller which is capable of reducing a response delay which may occur due to the inertia of an electric motor.

The electric power steering controller according to the present invention comprises: a basic assist electric current generating section for generating a basic assist electric current value in accordance with a steering torque; a first inertia compensation value generating section for calculating a first steering torque differential value equivalent corresponding to a time-based differential value of the steering torque and for generating a first inertia compensation value in accordance with the first steering torque differential value equivalent; a target electric current value generating section for generating an assist target electric current value by adding the first inertia compensation value generated by the first inertia compensation value generating section to the basic assist electric current value generated by the basic assist electric current generating section; and a motor driving section for driving an electric motor on the basis of the assist target electric current value generated by the target electric current value generating section.

The controller preferably further comprises a second inertia compensation value generating section for calculating a second steering torque differential value equivalent corresponding to a time-based differential value of a steering torque component obtained by removing a high frequency component from the steering torque and for generating a second inertia compensation value in accordance with the second steering torque differential value. In this case, the target electric current value generating section is preferably adapted to generate the assist target electric current value by adding the first inertia compensation value and the second inertia compensation value to the basic assist electric current value.

In accordance with the present invention, the first inertia compensation value is generated in accordance with the first steering torque differential value equivalent corresponding to the time-based differential value of the steering torque including the high frequency component, and the assist target electric current value is generated on the basis of the first inertia compensation value thus generated. The assist target electric current value generated on the basis of the first inertia compensation value is a value corrected for improvement of the responsiveness when the steering torque varies with a high frequency. Therefore, the electric motor controlled on the basis of the assist target electric current value can generate a steering assist force in quick response to a steering operation in which an operation member is quickly and slightly turned.

The second inertia compensation value is generated in accordance with the second steering torque differential value equivalent corresponding to the time-based differential value of the steering torque component obtained by removing the high frequency component from the steering torque. Therefore, the assist target electric current value including the second inertia compensation value is a value corrected for improvement of the responsiveness when the steering torque is gradually changed. Therefore, the electric motor controlled on the basis of the assist target electric current value determined in consideration of the second inertia compensation value can generate the steering assist force in quick response to a slalom steering operation in which the operation member is dynamically turned.

This eliminates the possibility that the driver experiences a heavy steering feeling or an entrapped feeling when operating the operation member.

The second inertia compensation value generating section may comprise a low pass filter for removing the high frequency component from the steering torque, and may be adapted to generate the second inertia compensation value in accordance with a time-based differential value of a steering torque component obtained by filtering the steering torque through the low pass filter.

The low pass filter may be implemented on a hardware basis, or through a computation for the removal of the high frequency component.

The foregoing and other objects, features and effects of the present invention will become more apparent from the following description of the preferred embodiments with reference to the attached drawings.

DESCRIPTION OF THE PREFERRED EMBODIMENTS

Figure 1:
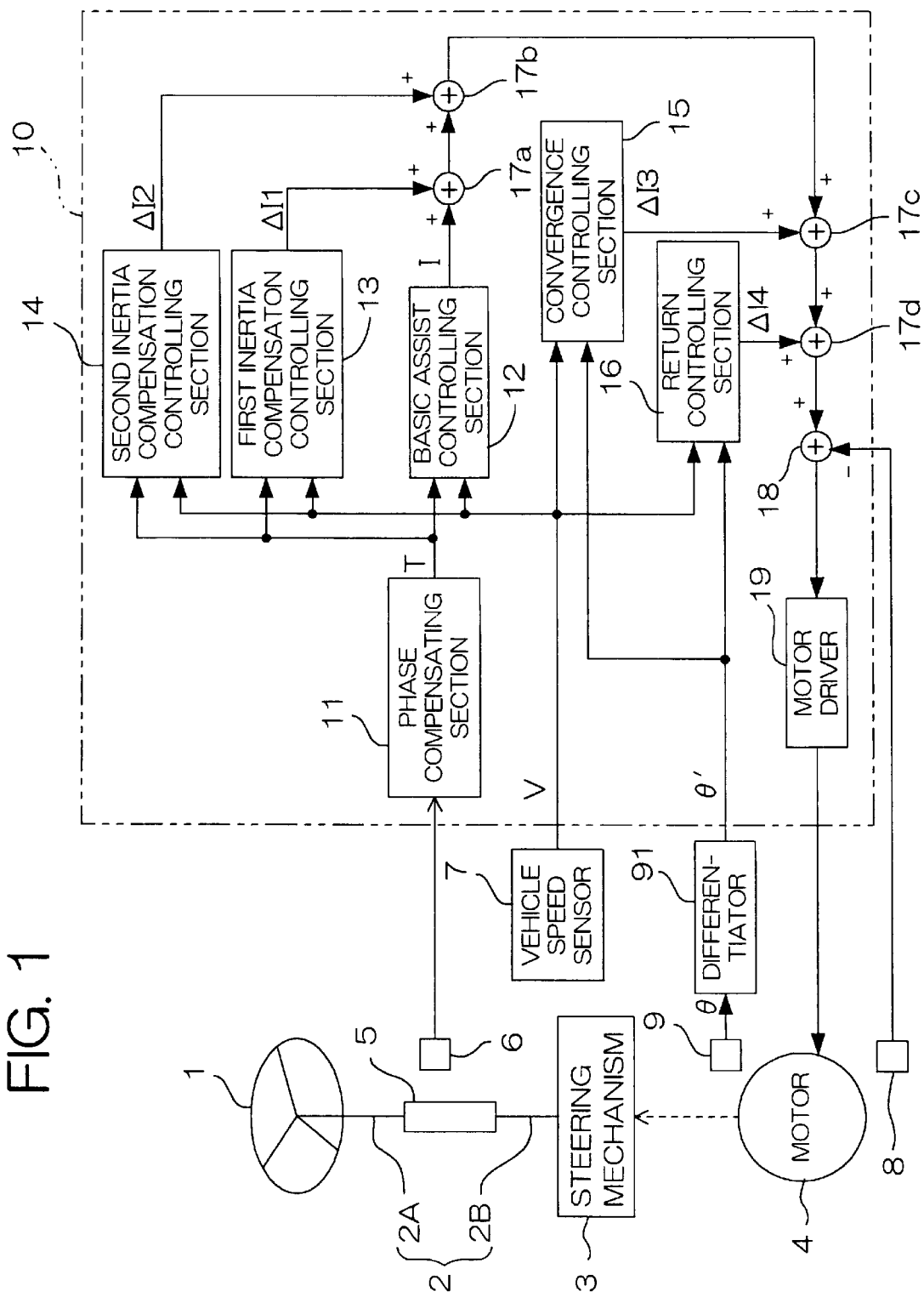
FIG. 1 is a block diagram illustrating the electrical construction of an electric power steering system according to one embodiment of the present invention.

FIG. 1 is a block diagram illustrating the electrical construction of an electric power steering system according to one embodiment of the present invention. A steering torque applied to a steering wheel 1 is mechanically transmitted to a steering mechanism 3 via a steering shaft 2. A driving force generated by an electric motor 4 is transmitted as a steering assist force to the steering mechanism 3 via a driving force transmission mechanism such as including a gear mechanism and a ball thread mechanism.

The steering shaft 2 is split into an input shaft 2A coupled to the steering wheel 1 and an output shaft 2B coupled to the steering mechanism 3. The input shaft 2A and the output shaft 2B are coupled to each other by a torsion bar 5. The torsion bar 5 is adapted to be twisted in accordance with the steering torque applied to the steering wheel 1, and the direction and magnitude of the steering torque are detected by a torque sensor 6. A detection signal of the torque sensor 6 (torque signal) is inputted to a controller 10 comprising a microprocessor.

Besides the detection signal of the torque sensor 6, detection signals of a vehicle speed sensor 7 for detecting a traveling speed V of a motor vehicle (vehicle speed) and a motor electric current detection circuit 8 for detecting an electric current flowing through the electric motor 4 are inputted to the controller 10. A rotation angle sensor 9 for detecting a rotation angle of the electric motor 4 is provided in association with the electric motor 4, and a motor rotation angular speed $\theta'$ obtained by differentiating the motor rotation angle $\theta$ detected by the rotation angle sensor 9 with time by means of a differentiator 91 is inputted to the controller 10. The controller 10 controls the electric motor 4 for driving thereof on the basis of the signal inputted from the torque sensor 6, the vehicle speed V detected by the vehicle speed sensor 7, the motor electric current value detected by the motor electric current detection circuit 8 and the motor rotation angular speed $\theta'$ generated by the differentiator 91 so as to apply the steering assist force to the steering mechanism 3 in accordance with operation of the steering wheel 1.

The controller 10 has a plurality of functioning sections which are implemented by executing operation programs stored in a storage medium (e.g., ROM) not shown. The functioning sections include: a phase compensating section 11 for advancing the phase of the detection signal of the torque sensor 6 for stabilization of the system; a basic assist controlling section 12 for generating a basic assist electric current value I which is substantially proportional to the steering torque T having a phase advanced by the phase compensating section 11; a first inertia compensation controlling section 13 and a second inertia compensation controlling section 14 for generating a first inertia compensation value $\Delta I1$ and a second inertia compensation value $\Delta I2$, respectively, for compensation for a response delay which may occur due to the inertia of the electric motor 4; a convergence controlling section 15 for generating a convergence correction value $\Delta I3$ on the basis of the vehicle speed V and the motor rotation angular speed $\theta'$ for improvement of steering convergence of the steering wheel 1, and a return controlling section 16 for generating a return correction value $\Delta I4$ on the basis of the vehicle speed V and the motor rotation angular speed $\theta'$ for improvement of return steering of the steering wheel 1.

The first inertia compensation value $\Delta I1$ generated by the first inertia compensation controlling section 13 is added to the basic assist electric current value I generated by the basic assist controlling section 12 in an adder 17a, and the second inertia compensation value $\Delta I2$ generated by the second inertia compensation controlling section 14 is added to an output of the adder 17a in an adder 17b. Further, the convergence correction value $\Delta I3$ generated by the convergence controlling section 15 is added to an output of the adder 17b in an adder 17c, and the return correction value $\Delta I4$ generated by the return controlling section 16 is added to an output of the adder 17c in an adder 17d. Thus, an assist target electric current value I+$\Delta I1$+$\Delta I2$+$\Delta I3$+$\Delta I4$ to be supplied to the electric motor 4 is obtained.

The assist target electric current value I+$\Delta I1$+$\Delta I2$+$\Delta I3$+$\Delta I4$ is applied to a subtracter 18. The subtracter 18 determines a difference between the motor electric current value detected by the motor electric current detection circuit 8 and the assist target electric current value I+$\Delta I1$+$\Delta I2$+$\Delta I3$+$\Delta I4$. A motor driver 19 for driving the electric motor 4 is controlled on the basis of the difference thus determined. Thus, an electric current corresponding to the assist target electric current value I+$\Delta I1$+$\Delta I2$+$\Delta I3$+$\Delta I4$ flows through the electric motor 4, whereby the electric motor 4 properly generates the steering assist force in accordance with the operation of the steering wheel 1.

The first inertia compensation controlling section 13 performs an interrupt operation for the generation of the first inertia compensation value $\Delta I1$ at a time interval of 500 $\mu$s. In the interrupt operation, a differential value equivalent T1'(n) of the steering torque including a high frequency component is calculated, and the first inertia compensation value $\Delta I1$ is generated on the basis of the steering torque differential value equivalent T1'(n) thus calculated. The differential value equivalent T1'(n) of the steering torque including the high frequency component corresponds to a time-based differential value of the steering torque T having the phase advanced by the phase compensating section 11, and is calculated from the following expression (1):

$$T1'(n)=(T1(n)-Y1(n-1))*G1 \tag{1}$$

wherein T1(n) is an instantaneous value of the steering torque T sampled from the phase compensating section 11 in a present n-th interrupt operation (n: a positive integer), and Y1(n-1) is a value obtained by removing a high frequency component from an instantaneous steering torque value sampled from the phase compensating section 11 in the preceding (n-1)-th interrupt operation. Therefore, T1(n)-Y1(n-1) corresponds to a change in the steering torque including the high frequency component, and the steering torque change is multiplied by a differential gain G1 to provide the differential value equivalent T1'(n) of the steering torque including the high frequency component.

In the interrupt operation for the generation of the first inertia compensation value $\Delta I1$, a sum S1(n) of steering torque changes obtained in the first to the n-th interrupt operations and Y1(n) required for calculation of a steering torque differential value equivalent T1'(n+1) in the next (n+1)-th interrupt operation are calculated from the following expressions (2) and (3):

$$S1(n)=S1(n-1)+T1(n)-Y1(n-1) \tag{2}$$

$$Y1(n)=S1(n)/A \tag{3}$$

In the expression (2), S1(n-1) is a sum calculated in the preceding (n-1)-th interrupt operation. In the expression (3), A is properly set within a range of 5 to 30 depending on characteristics of the motor vehicle.

Figure 2:
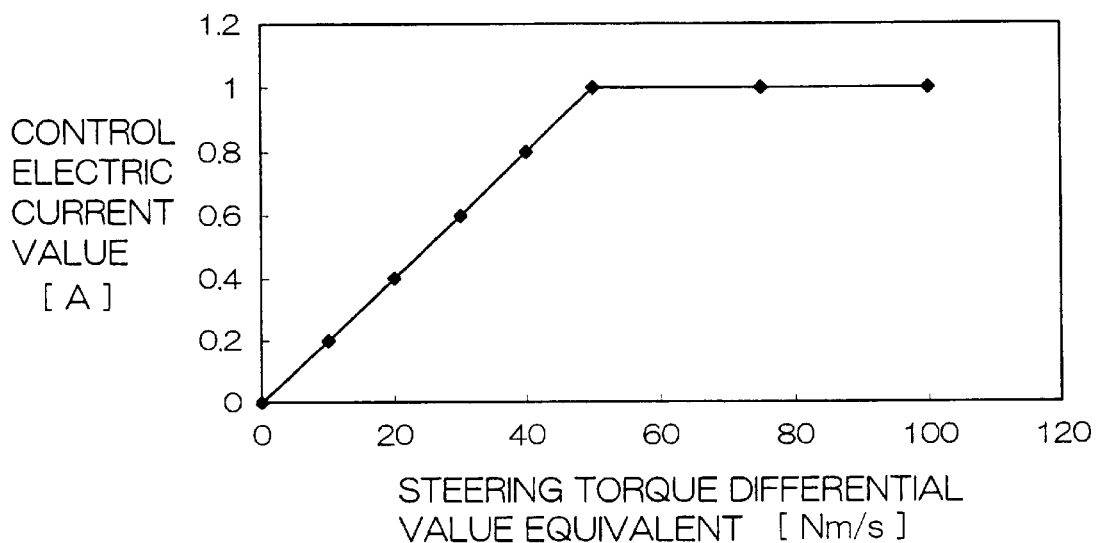
FIG. 2 is a diagram illustrating one example of a characteristic map indicative of a relationship between a steering torque differential value equivalent and a control electric current value.

Thereafter, a control electric current value is determined in accordance with the steering torque differential value equivalent T1' (n), for example, with reference to a characteristic map indicative of a relationship between the steering torque differential value equivalent and the control electric current value as shown in FIG. 2. More specifically, the control electric current value is set so as to increase from 0 to 1 A (ampere) proportionally to the steering torque differential value equivalent T1' (n) as the steering torque differential value equivalent T1' (n) changes from 0 to 50 Nm/s, and to be kept constant at 1 A in a range of the steering torque differential value equivalent T1' (n) of 50 to 100 Nm/s.

Figure 3:
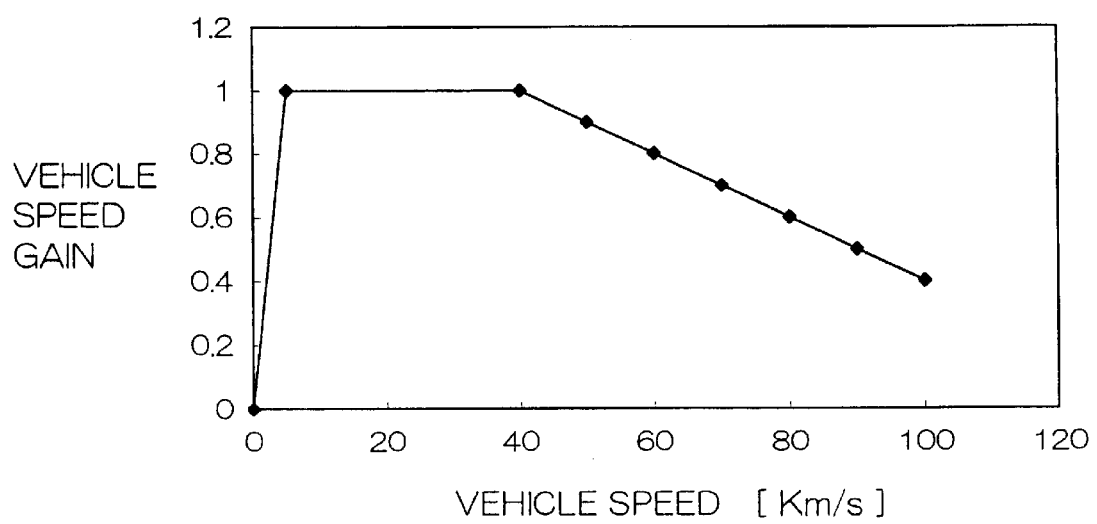
FIG. 3 is a diagram illustrating one example of a characteristic map indicative of a relationship between a vehicle speed and a vehicle speed gain.

Further, a vehicle speed gain is determined in accordance with the vehicle speed V, for example, with reference to a characteristic map indicative of a relationship between the vehicle speed and the vehicle speed gain as shown in FIG. 3. More specifically, the vehicle speed gain is set so as to increase from 0 to 1 proportionally to the vehicle speed V as the vehicle speed changes from 0 to 5 km/h, to decrease from 1 to 0.4 proportionally to the vehicle speed V as the vehicle speed V changes from 40 to 100 km/h, and to be kept constant at 1 in a range of the vehicle speed V of 5 to 40 km/h.

The control electric current value determined in accordance with the differential value equivalent T1' (n) of the steering torque including the high frequency component is multiplied by the vehicle speed gain determined in accordance with the vehicle speed, and the resulting product is employed as the first inertia compensation value $\Delta I1$. Since the first inertia compensation value $\Delta I1$ is determined in consideration of the high frequency component of the steering torque T, the assist target electric current value $I+\Delta I1+\Delta I2+\Delta I3+\Delta I4$ including the first inertia compensation value $\Delta I1$ is a value corrected for improvement of the responsiveness when the steering torque T varies with a high frequency. The motor driver 19 is controlled on the basis of the assist target electric current value $I+\Delta I1+\Delta I2+\Delta I3+\Delta I4$, whereby the electric motor 4 generates the steering assist force in quick response to a steering operation in which the steering wheel 1 is quickly turned.

The second inertia compensation controlling section 14 performs an interrupt operation for the generation of the second inertia compensation value $\Delta I2$, for example, at a time interval of 500 $\mu$s. In the interrupt operation, a differential value equivalent T2' (n) of a steering torque component obtained by removing the high frequency component from the steering torque is calculated, and the second inertia compensation value $\Delta I2$ is generated on the basis of the steering torque differential value equivalent T2' (n) thus calculated. The differential value equivalent T2' (n) of the steering torque component excluding the high frequency component corresponds to a value obtained by removing the high frequency component from the steering torque T having the phase advanced by the phase compensating section 11 and then differentiating the steering torque component excluding the high frequency component with time, and is calculated from the following expression (4):

$$T2'(n)=(Y2(n)-Y2(n-1))*G2 \qquad (4)$$

wherein Y2 (n) is a value obtained by removing a high frequency component from an instantaneous steering torque value T2 (n) sampled from the phase compensating section 11 in the present n-th interrupt operation, and Y2(n−1) is a value obtained by removing a high frequency component from an instantaneous steering torque value sampled from the phase compensating section 11 in the preceding (n−1)-th interrupt operation. Therefore, Y2(n)−Y2(n−1) corresponds to a change in the steering torque component excluding the high frequency component, and the steering torque change is multiplied by a differential gain G2 to provide the differential value equivalent T2' (n) of the steering torque component excluding the high frequency component.

The value Y2(n) obtained by removing the high frequency component from the instantaneous steering torque value T2 (n) is calculated from the following expressions (5) and (6):

$$S2(n)=S2(n-1)+T2(n)-Y2(n-1) \qquad (5)$$

$$Y2(n)=S2(n)/B \qquad (6)$$

wherein S2 (n) is a sum of steering torque changes obtained in the first to the n-th interrupt operations. In the expression (5), S2(n−1) is a sum calculated in the preceding (n−1)-th interrupt operation. In the expression (6), B is properly set, for example, within a range of 100 to 300 depending on the characteristics of the motor vehicle.

Thereafter, a control electric current value is determined in accordance with the steering torque differential value equivalent T2' (n), for example, with reference to the characteristic map indicative of the relationship between the steering torque differential value equivalent and the control electric current value shown in FIG. 2. Further, a vehicle speed gain is determined in accordance with the vehicle speed V, for example, with reference to the characteristic map indicative of the relationship between the vehicle speed and the vehicle speed gain shown in FIG. 3.

The control electric current value determined in accordance with the differential value equivalent T2' (n) of the steering torque component excluding the high frequency component is multiplied by the vehicle speed gain determined in accordance with the vehicle speed, and the resulting product is employed as the second inertia compensation value $\Delta I2$. Therefore, the assist target electric current value $I+\Delta I1+\Delta I2+\Delta I3+\Delta I4$ including the second inertia compensation value $\Delta I2$ is a value corrected for improvement of the responsiveness when the steering torque is gradually changed. The motor driver 19 is controlled on the basis of the assist target electric current value $I+\Delta I1+\Delta I2+\Delta I3+\Delta I4$, whereby the electric motor 4 generates the steering assist force in quick response to a slalom steering operation in which the steering wheel 1 is dynamically turned in opposite directions.

In accordance with this embodiment, the steering assist operation can be performed in quick response to the slalom steering operation in which the steering wheel 1 is dynamically turned in opposite directions and to the quick steering operation of the steering wheel 1. This eliminates the possibility that the driver experiences a heavy steering feeling or an entrapped feeling when operating the steering wheel 1.

In this embodiment, the denominators A and B in the expressions (3) and (6) satisfy a relationship of A<B. The denominator A is set relatively small because the steering torque differential value equivalent T1' (n) includes the high frequency component. The denominator B is set relatively great because the steering torque differential value equivalent T2' (n) excludes the high frequency component.

Figure 4:
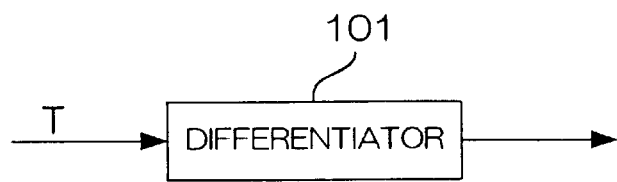
FIG. 4 is a diagram for explaining another process for generation of a first inertia compensation value.
Figure 5:
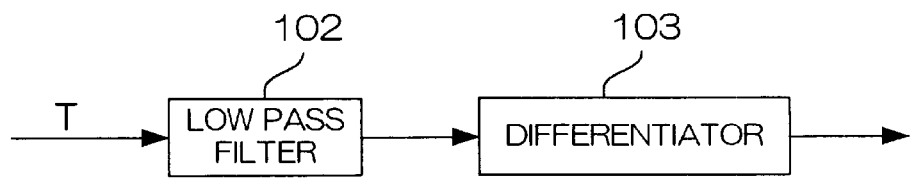
FIG. 5 is a diagram for explaining another process for generation of a second inertia compensation value.

While the embodiment of the present invention has thus been described, the invention may be embodied in any other ways. The first inertia compensation value $\Delta I1$ is generated on the basis of the steering torque differential value equivalent T1' (n) in the embodiment described above, but may be generated on the basis of a steering torque differential value generated by differentiating the steering torque T with time by means of a differentiator 101 as shown in FIG. 4. Further, the second inertia compensation value ΔI2 is generated on the basis of the steering torque differential value equivalent T2' (n) in the embodiment described above, but may be generated on the basis of a differential value of a high-frequency-free steering torque component obtained by filtering the steering torque T through a low pass filter 102 to remove the high frequency component therefrom and then differentiating the filtered steering torque T with time by means of a differentiator 103 as shown in FIG. 5. In this case, the low pass filter may be implemented on a hardware basis, for example, by a resistor and a capacitor, or by a computation program incorporating the process described in the aforesaid embodiment (low pass filtering process) for the removal of the high frequency component.

The characteristic map indicative of the relationship between the steering torque differential value equivalent and the control electric current value shown in FIG. 2 and the characteristic map indicative of the relationship between the vehicle speed and the vehicle speed gain shown in FIG. 3 are merely examples, and may be modified depending on the characteristics of the motor vehicle.

Although the same characteristic maps indicative of the relationships between the steering torque differential value equivalent and the control electric current value and between the vehicle speed and the vehicle speed gain are employed for the generation of the first inertia compensation value ΔI1 and for the generation of the second inertia compensation value ΔI2 in the embodiment described above, different characteristic maps may be employed for the generation of the first inertia compensation value ΔI1 and for the generation of the second inertia compensation value ΔI2.

While the present invention has been described in detail by way of the embodiment thereof, it should be understood that the foregoing disclosure is merely illustrative of the technical principles of the present invention but not limitative of the same. The spirit and scope of the present invention are to be limited only by the appended claims.

This application corresponds to Japanese Patent Application No. 2000-363122 filed to the Japanese Patent Office on Nov. 29, 2000, the disclosure thereof being incorporated herein by reference.

What is claimed is:

1. A controller for an electric power steering system which generates a steering assist force by an electric motor driven on the basis of a steering torque applied to an operation member, the electric power steering controller comprising:

a basic assist electric current generating section for generating a basic assist electric current value in accordance with the steering torque;

a first inertia compensation value generating section for calculating a first steering torque differential value equivalent corresponding to a time-based differential value of the steering torque and for generating a first inertia compensation value in accordance with the first steering torque differential value equivalent;

a second inertia compensation value generating section for calculating a second steering torque differential value equivalent corresponding to a time-based differential value of a steering torque component obtained by removing a high frequency component from the steering torque and for generating a second inertia compensation value in accordance with the second steering torque differential value equivalent, a target electric current value generating section for generating an assist target electric current value; and a motor driving section for driving the electric motor on the basis of the assist target electric current value generated by the target electric current value generating section, wherein the target electric current value generating section generates the assist target electric current value by adding at least the first inertia compensation value generated by the first inertia compensation value generating section, the second inertia compensation value generated by the second inertia compensation value generating section, and the basic assist electric current value generated by the basic assist electric current generating section.

2. An electric power steering controller as set forth in claim 1, wherein the second inertia compensation value generating section comprises a low pass filter for removing the high frequency component from the steering torque, and the steering torque is filtered through the low pass filter to generate the steering torque component that is obtained by removing the high frequency component from the steering torque.

3. An electric power steering controller as set forth in claim 1, wherein the second inertia compensation value generating section determines the second inertia compensation value by multiplying a control electric current value determined with reference to a characteristic map indicative of a relationship between the steering torque differential value and the control electric current value by a vehicle speed gain determined in accordance with a vehicle speed.

4. An electric power steering controller as set forth in claim 1, wherein the first inertia compensation value generating section determines the first inertia compensation value by multiplying a control electric current value determined with reference to a characteristic map indicative of a relationship between the steering torque differential value and the control electric current value by a vehicle speed gain determined in accordance with a vehicle speed.

* * * * *